United States Patent
Khalil

(10) Patent No.: US 8,673,261 B2
(45) Date of Patent: Mar. 18, 2014

(54) PROCESS FOR PREPARING MAGNETITE (FE$_3$O$_4$) AND DERIVATIVES THEREOF

(75) Inventor: Mutasim Ibrahim Khalil, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 13/879,415

(22) PCT Filed: Mar. 26, 2012

(86) PCT No.: PCT/EP2012/001311
§ 371 (c)(1),
(2), (4) Date: Apr. 15, 2013

(87) PCT Pub. No.: WO2012/130428
PCT Pub. Date: Oct. 4, 2012

(65) Prior Publication Data
US 2014/0017164 A1    Jan. 16, 2014

(30) Foreign Application Priority Data

Mar. 28, 2011  (EP) .................................. 11160017

(51) Int. Cl.
*C01G 49/00*    (2006.01)
(52) U.S. Cl.
USPC .................... 423/594.1; 423/594.2; 423/632; 423/634

(58) Field of Classification Search
USPC ........................... 423/594.1, 594.2, 632, 634
See application file for complete search history.

(56) References Cited

U.S. PATENT DOCUMENTS 6,767,635 B1    7/2004 Bahr et al.

OTHER PUBLICATIONS

Xu et al.; "Organic phase synthesis of monodisperse iron oxide nanocrystals using iron chloride as precursor", vol. 2, May 11, 2010, pp. 1027-1032.
PCT/EP2012/001311; PCT International Search Report and Written Opinion of the International Searching Authority mailed May 22, 2012.

*Primary Examiner* — Steven Bos
(74) *Attorney, Agent, or Firm* — Renner, Otto, Boisselle & Sklar, LLP

(57) ABSTRACT

The present invention relates to a process for preparing magnetite (Fe$_3$O$_4$) or derivatives thereof, comprising the steps: a) preparing an aqueous solution A of a Fe(III) salt, b) preparing an aqueous solution B of an iodide salt, c) mixing solutions A and B to obtain a first precipitate, d) separating the first precipitate to obtain a filtrate, e) hydrolyzing the filtrate obtained in step d) by adjusting the pH to about 8.5-9 or above, preferably 9, in order to obtain a second precipitate, and f) separating the second precipitate.

16 Claims, No Drawings

PROCESS FOR PREPARING MAGNETITE (FE₃O₄) AND DERIVATIVES THEREOF

The present application is a U.S. National Stage Application based on and claiming benefit under 35 U.S.C. §371 of PCT/EP2012/001311, filed 26 Mar. 2012, which in turn claims priority to European Application No. 11160017.7, filed 28 Mar. 2011, the entirety of both of which are hereby incorporated herein by reference.

FIELD

The present invention relates to a process for preparing magnetite and derivatives thereof.

BACKGROUND

Magnetite is a ferrimagnetic mineral with the chemical formula $Fe_3O_4$, one of several iron oxides and a member of the spinel group. The chemical IUPAC name is iron(II, III) oxide.

Several methods are known in the art for the synthesis of magnetite. R. M. Cornwell and U. Schwertmann, "The Iron Oxides.Structure, Properties, Reactions, Occurance and Uses." Sec. Ed., WILLEY-VCH, Weinheim, 2000, have reported several synthetic methods all of which require more than one iron compound as precursor, several chemical reagents, inert atmosphere, special apparatus and/or other restricting conditions. Exemplary methods are:

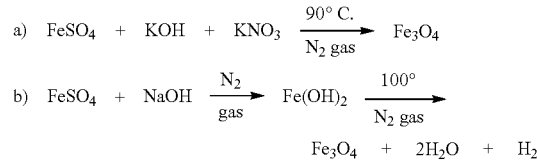

c) Reduction of hematite at 400° C. in an atmosphere of 5% $H_2$/95% Ar, saturated with water vapour free of $O_2$ d) Reaction of a 1:2 $Fe^{II}/Fe^{III}$ solution, under alkaline conditions at 80° C. under $N_2$ e) Reaction at 85° C. of $Fe^{II}$ ammonium sulphate solution (buffered to pH 7-8 with sodium acetate) with hydroxylamine sulphate; the suspension is held under $N_2$ gas $$3Fe^{2+} + NH_3OH^+ + 3H_2O \rightarrow Fe_3O_4 + NH_4^+ + 6H^+$$

f) Reductive transformation in a sealed ampoule of an akaganeite suspension in the presence of hydrazine at pH 9.5-1.5 and 100° C.

$$12\beta\text{-FeOOH} + N_2H_2 \rightarrow 4Fe_3O_4 + 8H_2O + N_2$$

g) Decomposition of an alkaline (0.2-0.4MOH) solution of $Fe^{III}NTA$ at 217° C. in an autoclave, h) Heating of iron hydroxide acetate at 200-260° C. under $N_2$ i) Boiling a mixture of $Fe^{II}$ sulphate and bispyridoxylidene hydrazine phthalazinc for 10 min. at pH7 j) Thermal decomposition of $Fe^{II}$ sulphide in air at 500° C.

$$3FeS_2 + 5O_2 \rightarrow Fe_3O_4 + 3S + 3SO_2$$

k) Holding a solution of $Fe^{II}$ acetylacetonate in 1-propanol under $N_2$ in an auto-clave at 300° C. for several hours l) Reduction of nitrobenzene to aniline produces $Fe_3O_4$;

$$4C_6H_5NO_2 + 9Fe + 4H_2O \xrightarrow{FeCl_2} C_6H_5NH_2 + 3Fe_3O_4$$

Further, methods for preparing magnetite are also known from U.S. Pat. No. 2,537,699, U.S. Pat. No. 4,311,684, U.S. Pat. No. 4,886,752 and U.S. Pat. No. 6,767,635B1.

SUMMARY

It is an object of the present invention to provide a process for preparing magnetite ($Fe_3O_4$) and derivatives thereof which overcomes the drawbacks of the prior art, especially a process which only requires one iron compound as starting precursor, a limited number of additional chemical reagents, and a process which can be carried out under simple reaction conditions, preferably at room temperature, with easy work-up of the product obtained. A highly pure and supermagnetic magnetite shall be provided.

DETAILED DESCRIPTION

This object is achieved by a method for preparing magnetite ($Fe_3O_4$) or derivatives thereof, comprising the steps:
a) preparing an aqueous solution A of a Fe(III) salt,
b) preparing an aqueous solution B of an iodide salt,
c) mixing solutions A and B to obtain a first precipitate,
d) separating the first precipitate to obtain a filtrate,
e) hydrolyzing the filtrate obtained in step d) by adjusting the pH to about 8.5-9 or above, preferably 9, in order to obtain a second precipitate, and
f) separating the second precipitate.

Preferably the molar ratio of Fe(III) in the aqueous solution A and of iodide in the aqueous solution B is from 3:1 to 1:1.4.

In an alternative embodiment, an aqueous solution C of at least one divalent cation M is added after step d) and before step e).

It is then preferred that the amounts of Fe(III) in the aqueous solution A, iodide in the aqueous solution B and divalent cation M in the aqueous solution C fulfil the following requirement: $Fe^{3+}_{2-y}I_{0-y}$, with $0 < y < 1$.

Moreover, it is preferred that the Fe(III) salt is selected from the group consisting of anhydrous $FeCl_3$, $FeCl_3 \cdot 6H_2O$ and $Fe(NO_3)_3 \cdot 9H_2O$.

The iodide may be selected from the group consisting of alkaline and earth alkaline iodides, such as potassium iodide, lithium iodide or sodium iodide.

It is preferred that the first and/or second precipitate(s) is (are) removed by filtration.

Adjusting the pH in step e) is preferably achieved by, preferably dropwise, addition of a base, preferably 2M NaOH or 25% ammonia solution.

In one embodiment, the process additionally comprises after step f) washing, preferably with distilled water, drying, preferably at a temperature of about 100-140° C., and optionally powdering of the precipitate obtained.

It is preferred that the process is carried out at a temperature of about 15-40° C., preferably at room temperature.

In one preferred embodiment an organic solvent, preferably alcohol and/or alkane, preferably ethanol and/or hexane, is added to the filtrate obtained in step d) prior to hydrolyzing.

Even preferred a gelling agent is added to the filtrate prior to hydrolyzing.

Finally the gelling agent may be selected from the group consisting of polyvinyl alcohol, polyacryl amide, gelatin, and gum arabic.

Surprisingly, it was found that by the process of the present invention highly pure and a supermagnetic magnetite can be prepared at room temperature using only one iron (III) compound as a starting precursor, the particles having nano scaled size. The process results in high yields of, preferably, above 98.0%.

The magnetite particles obtained have a particle size in the nanometer range, i.e. from about 50-500 nm. Especially, magnetite obtained from pure aqueous solution has a particle size of about 150-400 nm, wherein the magnetite obtained from a solution also containing organic solvent(s) has a particle size in the range of about 80 nm.

Additionally, the process is environmentally very benign, one of the by-products obtained, iodine, is commercially valuable and is almost quantitatively produced. No heat energy is required for the inventive process, the synthesis can be carried out efficiently at room temperature. Further, no inert atmosphere, such as $N_2$, Ar, etc. is required, as well as no sophisticated apparatus or techniques.

Other chemical reagents used are non-costy and commercially available. Also, no pressure is used, the process can be carried out at ambient atmospheric pressure.

The products obtained can be easily separated and purified, if necessary. In preferred embodiments, it is possible to prepare magnetite derivatives, i.e. spinels in that some of the iodide added is replaced by a divalent cation. Preferred divalent cations are well known in the art and can be, for example, selected from $Mg^{2+}$, $Co^{2+}$, $Ni^{2+}$, $Cu^{2+}$, $Zn^{2+}$, etc. or mixtures thereof.

In a further preferred embodiment, the magnetite or derivative thereof can be introduced into a magnetic gel or magnetic fluid. For this purpose, a gelling agent is added into the preparation process which may then be further processed, for example preparing it into a sheet which is supermagnetic.

Additional and advantageous features of the process of the present invention can be taken from the following detailed description of preferred embodiments which are not to be taken to limit the scope of protection which is only defined by the appending claims.

The magnetite obtained in the following examples was characterized and identified using FTIR, X-ray diffraction, SEM, EDS, electrical conductivity and magnetic susceptibility. The results confirm the presence of the magnetite.

EXAMPLE 1

Synthesis of Magnetite from Anhydrous Ferric Chloride

Step I 19.46 g (0.119 mol) of anhydrous $FeCl_3$ is completely dissolved in 150 ml distilled water to prepare an aqueous solution A. Further, 6.584 g (0.0396 mol) of potassium iodide is dissolved in 50 ml of distilled water to prepare an aqueous solution B.

Step II

The aqueous solutions A and B are then mixed together at room temperature, stirred and allowed to reach equilibrium for one hour. A precipitate of iodine is obtained based on following equation:

$$3Fe^{3+} + I^- \rightarrow 2Fe^{3+} + Fe^{2+} + \tfrac{1}{2}I_2$$

The precipitate is filtered out, washed with distilled water, dried at 100° C. and weighed. After drying, 5.076 g of precipitate, i.e. 86.68% yield, was obtained. The washings are added to the filtrate.

Step III

The whole volume of filtrate (including washings) is then hydrolyzed using 25% ammonia solution which is dropwise added with stirring. Mixing is continued until complete precipitation of black magnetite is achieved. The set up is then left to settle, filtered, washed with distilled water, dried at 120° C. and weighed. 9.2 g $Fe_3O_4$ is obtained resulting in a percentage yield of 99.0%.

EXAMPLE 2

Steps I and II are repeated as in experiment 1. 4.1 g of $I_2$ is obtained, resulting in a percentage yield of about 80.0%.

Step III

The whole filtrate (250 ml) is mixed with 500 ml ethanol, and 25% ammonia solution is dropwise added under stirring until complete precipitation of magnetite is achieved. The black magnetite is filtered out, washed with distilled water, dried at 120° C. and weighed. 9.16 g of magnetite are obtained, i.e. a percentage yield of 98.8%.

EXAMPLE 3

Steps I and II are carried out as in example 1 as given above. 4.1 $I_2$ are obtained (percentage yield 80.7%).

Step III

The volume of filtrate is made up to 250 ml volume in a volumetric flask by adding distilled water. 60 ml of this solution is mixed with 80 ml ethanol and 140 ml hexane, and the magnetite is then precipitated by the addition of 25% ammonia solution, which is then allowed to settle, filtered, washed with distilled water, dried at 120° C. and weighed. The black magnetite attained a reddish brown colour upon powdering using a pistol and mortar. 2.17 g of $Fe_3O_4$ are obtained, resulting in a percentage yield of 97.7%.

EXAMPLE 4

Synthesis of Magnetite from Ferric Chloride Hexahydrate ($FeCl_3.6H_2O$)

Step I

An aqueous solution A of 27.03 g (0.1 mol) of $FeCl_3.6H_2O$ in 150 ml distilled water is prepared. Further, 5.533 g (0.0333 mol) of KI is dissolved in 50 ml distilled water to prepare a solution B.

Step II

The aqueous solutions A and B are mixed together at room temperature, stirred and left to reach equilibrium for 1 hour. A precipitate is obtained which is filtered out, washed with distilled water, dried at 110° C. and weighed. 3.15 g of $I_2$ (percentage yield 75.35%) is obtained.

All the washings are added to the iron solution filtrate and made up to 250 ml volume in a 250 ml volumetric flask.

Step III

Three 50 ml portions of the iron solution are transferred to three separate beakers. To each portion the following was added:

Portion 1: 10 ml water
Portion 2: 10 ml water+80 ml ethanol
Portion 3: 10 ml water+80 ml ethanol+140 ml hexane.

Black magnetite is then precipitated from each solution by dropwise addition of 25% ammonia solution (pH-9.0). The three reaction mixtures are left to reach equilibrium, filtered, washed with distilled water, dried at 120° C. and weighed and are finally powdered using a pistol and mortar to give a reddish brown magnetite. Results can be taken from table 1 below.

TABLE 1

| Solution | Portion 1 | Portion 2 | Portion 3 |
|---|---|---|---|
| Weight of $Fe_3O_4$ | 1.47 | 1.38 | 1.35 |
| Percentage yield | 96.2 | 90.3 | 88.35 |

The $Fe_3O_4$ obtained from pure aqueous medium had a particle size of 150-400 nm. $Fe_3O_4$ obtained from aqueous/organic solutions had a particle size of about 80 nm.

That means that the particle size of the magnetite can be influenced by the choice of solvents used in the filtrate prior to hydrolyzing and precipitating the magnetite.

EXAMPLE 5

Synthesis of Magnetite from Ferric Nitrate $Fe(NO_3)_3 \cdot 9H_2O$

Step I

Two aqueous solutions are prepared. A first aqueous solution A by dissolving 16.16 g (0.04 mol) of $Fe(NO_3)_3 \cdot 9H_2O$ in 150 ml distilled water; and a second aqueous solution B by dissolving 2.213 g (0.0133 mol) KI in 50 ml distilled water.

Step II

The two solutions A and B are then mixed together, stirred and allowed to react at a room temperature for several hours. The precipitate obtained is then filtered out, washed with distilled water, dried at 110° C. and weighed. 0.9 g of $I_2$ (percentage yield 54.57%) is obtained. All washings are added to the filtrate.

Step III

The iron solution filtrate is then made up to 250 ml volume by water in a 250 ml volumetric flask. Three 50 ml portions of this iron solution are transferred to three separate beakers. To each portion the following solvents are added:

Portion 1: 10 ml distilled water
Portion 2: 10 ml distilled water+80 ml ethanol
Portion 3: 10 ml distilled water+80 ml ethanol+140 ml hexane The magnetite is then precipitated from each solution while immersed in a bath of an ultrasonic vibrator by dropwise addition of 25% ammonia solution until a clear supernatant liquid layer is obtained, or when the reddish colour of solution disappeared. The black magnetite from each portion is then filtered, washed with distilled water, dried at 120° C. and weighed. The magnetite is then powdered finally using a pistol and mortar whereupon the magnetite attained a reddish brown colour.

Results can be taken from table 2 below.

TABLE 2

| Solution | Portion 1 | Portion 2 | Portion 3 |
|---|---|---|---|
| Weight of $Fe_3O_4$ | 1.62 | 1.65 | 1.63 |
| Percentage yield | 52.47 | 53.44 | 52.80 |

EXAMPLE 6

As can be taken from example 5, a low percentage yield is obtained, which is assumed to be due to the presence of the oxidizing nitrate group. For that reasons, an excess of KI is added, namely 8.852 g (0.053 mol) to counteract the effect. Otherwise, steps I-III (portion 2) as in example 5 are then repeated. The results can be taken from table 3 below:

TABLE 3

| | $I_2$ | $Fe_3O_4$ |
|---|---|---|
| Theoretical yield (g) | 1.649 | 3.087 |
| Actual yield | 1.60 | 2.99 |
| Percentage yield | 97.0 | 96.85 |

EXAMPLE 7

Synthesis of a Spinel of the Type $Fe_2^{III}Fe^{II}_{1-x}M_xO_4$

A spinel of the type $Fe_2^{III}Fe^{II}_{1-x}M_xO_4$ with M being a divalent cation (such as $Mg^{2+}$, $Co^{2+}$, $Ni^{2+}$, $Cu^{2+}$, $Zn^{2+}$, etc.) and with $0<x<1$ can be obtained carrying out steps I and II as disclosed above in examples 1-6.

A solution of the divalent cation M or mixture of cations may then be added to the iron filtrate solution. 2 M NaOH solution is then added dropwise to this mixture with continuous stirring until pH 9.5 or a clear supernatant solution is obtained.

The precipitate obtained is filtered, washed with water and dried at 120° C. According to the ratios as chosen, a spinel as disclosed by the above formula can be obtained. In this regard, it is preferred that the starting amounts of $Fe^{3+}$, $I^-$ and $M^{2+}$ are chosen to satisfy the following requirement: $Fe^{3+}_{2 \cdot y}I_{0 \cdot y}M_{1-0 \cdot y}$, with $0<y<1$.

If, e.g. 2.5 mol $Fe^{3+}$ is taken (y=5), the added $I^-$ concentration is 0.5 mol, and hence the $M^{2+}$ concentration that should be added to produce the desired spinel is 0.5, namely 1−y, 1−0.5=0.5. The resulting product is then $Fe_2^{III}Fe_{0.5}^{II}M_{0.5}O_4$.

If 2.1 mol $Fe^{3+}$ salt is taken, 0.1 mol KI and the 0.9 mol of $M^2$ salt is to be added resulting in a product of $Fe_2^{(III)}Fe_{0.1}M_{0.9}O_4$.

EXAMPLE 8

Synthesis of Magneto Gels and Magneto Fluids

Magneto gels and magneto fluids containing magnetite can be obtained by adding a gelling agent into the process after separating $I_2$ from the filtrate, but prior to hydrolyzing.

Any gelling agent known in the art can be in principal utilized. Preferred gelling agents are, for example, polyvinyl alcohol, polyacrylamide, gelatin or gum arabic. Gelling agent may be added to the filtrate to result in any concentration, preferably the filtrate has a concentration of gelling agent of 1-5%.

It is possible to add the gelling agent as aqueous solution or as a solid.

After having prepared the filtrate to be hydrolyzed, 2 M NaOH or 25% ammonia solution is added to this filtrate until complete gelling is observed. The excess liquid is then preferably decanted and the gel or fluid is stirred to a homogeneous gelatinous solution. The viscosity can be increased by evaporation or the gel may be spread into sheets which are then supermagnetic.

The features disclosed in the foregoing description and in the claims may, both separately and in any combination thereof, be material for realizing the invention in diverse forms thereof.

The invention claimed is:

1. Process for preparing magnetite ($Fe_3O_4$) or derivatives thereof, comprising the steps:
   a) preparing an aqueous solution A of a Fe(III) salt,
   b) preparing an aqueous solution B of an iodide salt,
   c) mixing solutions A and B to obtain a first precipitate,
   d) separating the first precipitate to obtain a filtrate,
   e) hydrolyzing the filtrate obtained in step d) by adjusting the pH to about 8.5 or above in order to obtain a second precipitate, and
   f) separating the second precipitate.

2. Process according to claim 1, wherein the molar ratio of Fe(III) salt in the aqueous solution A and of iodide salt in the aqueous solution B is from 3:1 to 1:1.4.

3. Process according to claim 1, wherein an aqueous solution C of at least one divalent cation M is added after step d) and before step e).

4. Process according to claim 1, wherein the Fe(III) salt is selected from the group consisting of anhydrous $FeCl_3$, $FeCl_3.6H_2O$ and $Fe(NO_3)_3.9H_2O$.

5. Process according to claim 1, wherein the iodide salt is selected from the group consisting of alkaline and alkaline earth iodides.

6. Process according to claim 1, wherein the first and/or second precipitate(s) is (are) removed by filtration.

7. Process according to claim 1, wherein adjusting the pH in step e) is achieved by addition of a base.

8. Process according to claim 1, additionally comprising after step f) washing, drying, and optionally powdering of the second precipitate obtained.

9. Process according to claim 1, wherein the process is carried out at a temperature of about 15-40° C.

10. Process according to claim 1, wherein an organic solvent is added to the filtrate obtained in step d) prior to hydrolyzing.

11. Process according to claim 1, wherein a gelling agent is added to the filtrate prior to hydrolyzing.

12. Process according to claim 11, wherein the gelling agent is selected from the group consisting of polyvinyl alcohol, polyacrylamide, gelatin, and gum arabic.

13. Process according to claim 7 wherein the base is 2M NaOH or 25% ammonia solution.

14. Process according to claim 8 wherein the drying is at a temperature of about 100-140° C.

15. Process according to claim 10 wherein the solvent is an alcohol and/or an alkane.

16. Process according to claim 10 wherein the solvent is ethanol and/or hexane.

* * * * *